No. 697,712. Patented Apr. 15, 1902.
H. GLARDON.
PADDLE WHEEL.
Application filed Jan. 24, 1902.

(No Model.)

Witnesses

Inventor
Henri Glardon
By Knight Bros
Attorneys

THE NORRIS PETERS CO., PHOTO-LITHO., WASHINGTON, D. C.

UNITED STATES PATENT OFFICE.

HENRI GLARDON, OF GALVESTON, TEXAS.

PADDLE-WHEEL.

SPECIFICATION forming part of Letters Patent No. 697,712, dated April 15, 1902.

Application filed January 24, 1902. Serial No. 91,098. (No model.)

*To all whom it may concern:*

Be it known that I, HENRI GLARDON, a citizen of Switzerland, residing at Galveston, in the county of Galveston and State of Texas, have invented certain new and useful Improvements in Paddle-Wheels, of which the following is a specification.

Figure 1:
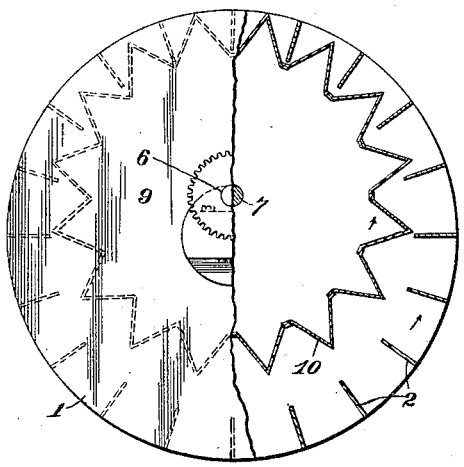
Figure 2:
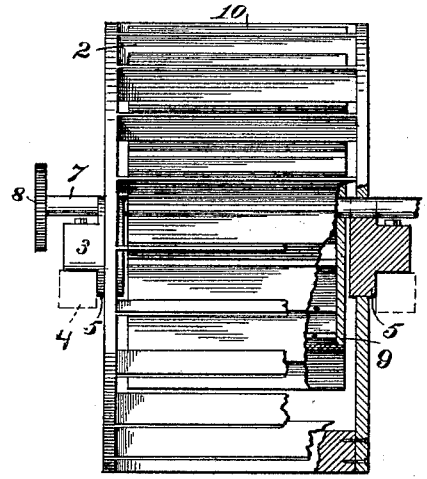
Figure 3:
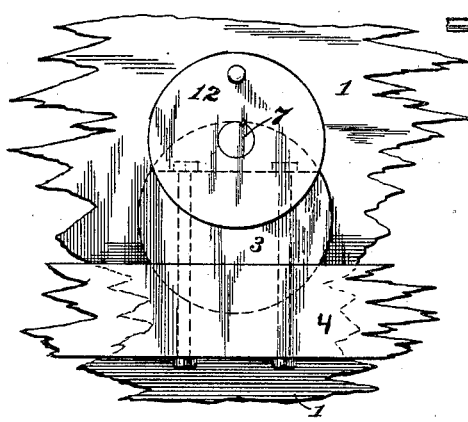
Figure 4:
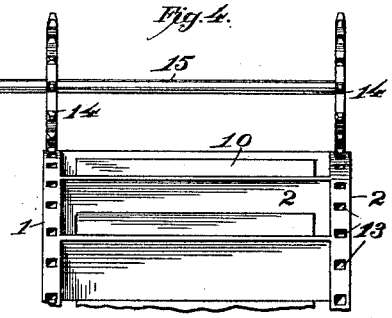

In the drawings, Figure 1 is a side elevation of my improved motor, parts being broken away. Fig. 2 is an end elevation of the same, parts broken away; and Figs. 3 and 4 are detail views.

1 represents a paddle-wheel having the transverse paddles 2 mounted in its periphery.

3 is a shaft mounted upon a suitable support 4, said shaft having a circular enlargement 5, upon which the said wheel 1 is adapted to freely rotate, each side of the wheel 1 being provided with a circular opening of a diameter sufficient to insure a snug fit with the enlargement 5 and at the same time permit the said wheel to rotate freely. The enlargement 5 is provided with a journal-bearing 6, within which is journaled the shaft 7, said shaft being provided at one end with a suitable pinion 8, to be hereinafter referred to.

9 is a drum composed of a series of inverted-V-shaped buckets 10, suitably secured together, said drum being rigidly mounted and keyed upon the shaft 7 within the paddle-wheel 1 and eccentrically positioned with respect to said wheel, as more clearly shown in Fig. 1. The relative position of the paddle-wheel 1 and the drum 9 is such that the buckets of the inner drum 9 intermesh with the paddles of the wheel 1 at the top, as clearly shown in Fig. 1.

For purposes of connecting the inner wheel with an engine I may place a pinion 8 upon the shaft 7 or secure a wrist-pin 12 upon said shaft.

In Fig. 4 I have shown the periphery of the paddle-wheel 1 provided with a series of depressions 13, which for all practical purposes form a rack-bar on said periphery, with which the pinions 14 are adapted to mesh, said pinion being mounted upon a suitable shaft 15, through which power is transmitted from a suitable engine or motor to the propelling-wheels.

The operation of this paddle-wheel is as follows: When the paddle-wheel is submerged about one-third, the buckets 10 of the drum within the paddle-wheel will be submerged in the water, and when power is applied to the paddle-wheel 1 these buckets will strike the water, which rushes in between the paddles 2, thereby forcing the water out again through said paddles. The drum-wheel 9, by reason of the engagement of the buckets 10 with the paddles 2 of the paddle-wheel 1, exerts power upon said paddle-wheel 1, in addition to the power of the engine connected to the paddle, thereby increasing the driving power of the wheel 1.

From the above it will be seen that the power of the paddle-wheel 1 and the drum 9 is concentrated in shaft 7. From this it will be seen that the shaft 7 is given the combined power converted by means of the outer paddle-wheel and the inner drum, thus concentrating the power of both wheels. The connection between the engine or motor and the pinion 8, the shaft 15, or the wrist-pin 12 is obvious, and hence it is not necessary to herein describe the same.

What I claim, and desire to secure by Letters Patent, is—

1. In a wheel of the character described, the combination with a paddle-wheel loosely mounted upon a shaft, of an inner paddle-wheel rigidly keyed to a shaft and mounted within and eccentrically to the first-named paddle-wheel, whereby the paddles of the respective wheels intermesh.

2. In a wheel of the character described, the combination with a support of a paddle-wheel mounted upon said support and adapted to freely revolve thereon, of a shaft journaled in said support and a paddle-wheel journaled in said support eccentrically to said paddle-wheel and a paddle-wheel rigidly keyed to said shaft within said wheel whereby the said paddle-wheels intermesh and their combined power is concentrated in the said shaft.

3. In a wheel of the character described, the combination with suitable supports, short shafts having circular enlargements secured to said supports and a paddle-wheel mounted to freely revolve upon said enlargements, of a shaft journaled in said enlargements eccentric to the paddle-wheel, a drum keyed to said shaft within said paddle-wheel, inverted-V-shaped buckets secured to the periphery of said drum and adapted to intermesh with the paddles of said paddle-wheel, whereby the combined power of the two wheels is concentrated, and means for transmitting said power.

The foregoing specification signed this 11th day of January, 1902.

HENRI GLARDON.

In presence of—
ED. A. NEBLETTS
J. SONNENTHEIL.